United States Patent

Rohs

[11] Patent Number: 5,924,953

[45] Date of Patent: Jul. 20, 1999

[54] FRICTION CONE GEARING

[76] Inventor: Ulrich Rohs, Roonstrasse 11, 52351 Düren, Germany

[21] Appl. No.: 08/859,735

[22] Filed: May 21, 1997

[51] Int. Cl.⁶ .................................................... F16H 15/16
[52] U.S. Cl. .............................................. 476/53; 476/52
[58] Field of Search ........................................ 476/52, 53

[56] References Cited

U.S. PATENT DOCUMENTS

| | | | |
|---|---|---|---|
| 760,460 | 5/1904 | Leighton | 476/53 |
| 1,637,664 | 8/1927 | Stoeckicht | 476/53 |
| 1,709,346 | 4/1929 | Garrard | 476/53 |
| 2,178,859 | 11/1939 | Jett et al. | |
| 2,205,031 | 6/1940 | Bugden | 74/192 |
| 2,583,790 | 1/1952 | Mikina | |
| 2,807,171 | 9/1957 | Wychoff | 476/53 |
| 2,865,213 | 12/1958 | Pernollet | 476/53 |
| 3,257,857 | 6/1966 | Davin et al. | 74/192 |
| 4,393,964 | 7/1983 | Kemper | |
| 5,208,102 | 5/1993 | Schulz et al. | 428/336 |
| 5,593,234 | 1/1997 | Liston | 384/492 |
| 5,601,509 | 2/1997 | Munoz | |

FOREIGN PATENT DOCUMENTS

| | | |
|---|---|---|
| 0 394 005 A1 | 10/1990 | European Pat. Off. . |
| 0 657 663 A1 | 6/1995 | European Pat. Off. . |
| 1144582 | 10/1957 | France . |
| 1 005 335 | 3/1957 | Germany . |
| 3835052 A1 | 5/1989 | Germany . |
| 195 42 726 A1 | 5/1997 | Germany . |
| 147 713 | 6/1931 | Switzerland . |
| 298676 | 11/1928 | United Kingdom . |
| 1 296 827 | 11/1972 | United Kingdom . |

OTHER PUBLICATIONS

Mark's Standard Handbook for Mechanical Engineers; pp. 11–8; ©1978.

*Primary Examiner*—John A. Jeffery
*Assistant Examiner*—David Fenstermacher
*Attorney, Agent, or Firm*—Henry M. Feierisen

[57] ABSTRACT

A friction cone gearing includes a housing, first and second bevel wheels received in the housing and rotatable about parallel rotational axes, with the bevel wheels having a same taper angle, a friction ring operatively engaged with the bevel wheels and encircling one of the bevel wheels, whereby the friction ring is guided along a generatrix of both bevel gears, and a cage for retaining the friction ring, with the cage being guided along the generatrix of both bevel gears and swingably mounted to the housing for pivoting about a pivot axis by means of a suitable drive mechanism.

11 Claims, 4 Drawing Sheets

FRICTION CONE GEARING

BACKGROUND OF THE INVENTION

The present invention refers to a friction cone gearing, and in particular to a friction cone gearing of a type having two bevel wheels mounted on parallel shafts for rotation in opposite directions and defined by a same taper angle, and a friction ring clamped between the bevel wheels and encircling one of the bevel wheels, with the friction ring being guided along the generatrix of both bevel wheels.

A friction cone gearing of this type is known from British Pat. No. 298,676, which describes the provision of a guide member held parallel to the shafts of the bevel wheels on a guide shaft for directing the friction ring along the bevel wheels, effecting a stepless adjustment of the transmission ratio of the friction cone gearing. The adjustment of the friction ring requires however a separate drive mechanism, rendering the gearing rather complex.

SUMMARY OF THE INVENTION

It is thus an object of the present invention to provide an improved friction cone gearing, obviating the afore-stated drawbacks.

In particular, it is an object of the present invention to provide an improved friction cone gearing with improved control of the friction ring to effect a gearing that is small in dimensions so as to be suitable for installation in motor vehicle transmissions.

These objects and others which will become apparent hereinafter are attained in accordance with the present invention by providing a friction ring operatively engaged with the bevel wheels and circumscribing one of the bevel wheels, with the friction ring being guided along a generatrix of both bevel wheels; and by providing a cage for retaining the friction ring, with the cage being guided along the generatrix of both bevel wheels and swingably mounted for pivoting about a pivot axis.

The slanted disposition of the friction ring at a slight angle with regard to the pivot axes of the bevel wheels in order to effect the intended axial displacement of the friction ring improves the overall control thereof and requires only very small energy in order to generate a pivoting of the friction ring.

The cage is defined by a pivot axis which may extend in a plane defined by the axes of rotation of the parallel shafts of the bevel wheels, or in a plane which is in parallel disposition to the plane defined by the axes of rotation of the shafts, or intersects the plane defined by the axes of rotation of the bevel wheels at an acute angle.

Preferably, at least one of the components of the gearing, i.e. bevel wheels or friction ring, is coated by a layer a material such as hard metal or ceramics, e.g. titanium nitride, titanium carbon nitride and titanium aluminum nitride.

The friction cone gearing according to the present invention is suitable in particular as gearbox of motor vehicles in conjunction with a hydraulic coupling and a gear selector mechanism for the change of traveling direction, for use in a front wheel drive or rear wheel drive.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
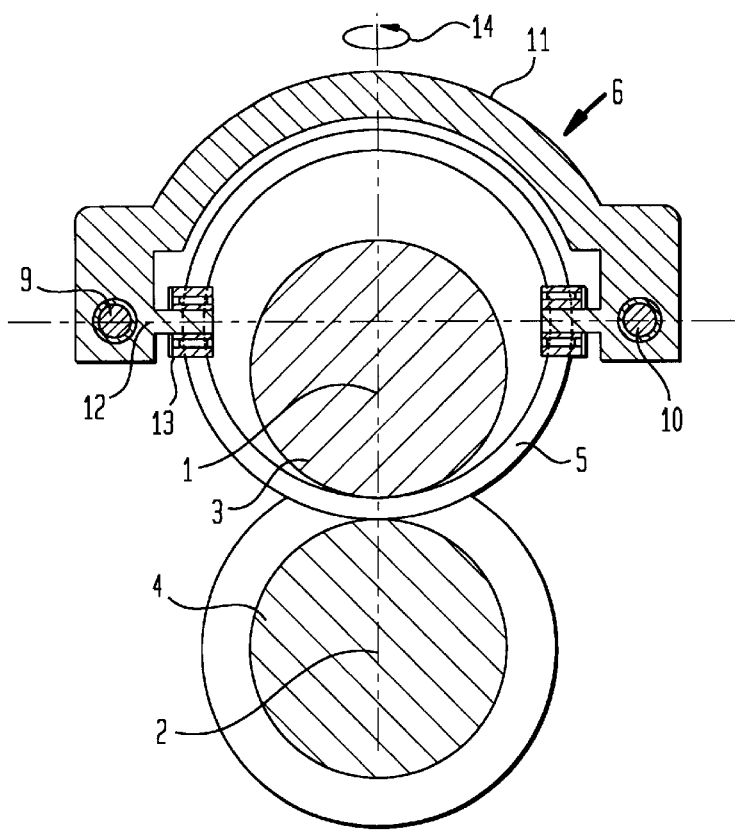
FIG. 1 is a schematic, partially sectional view of a friction cone gearing according to the present invention.
Figure 2:
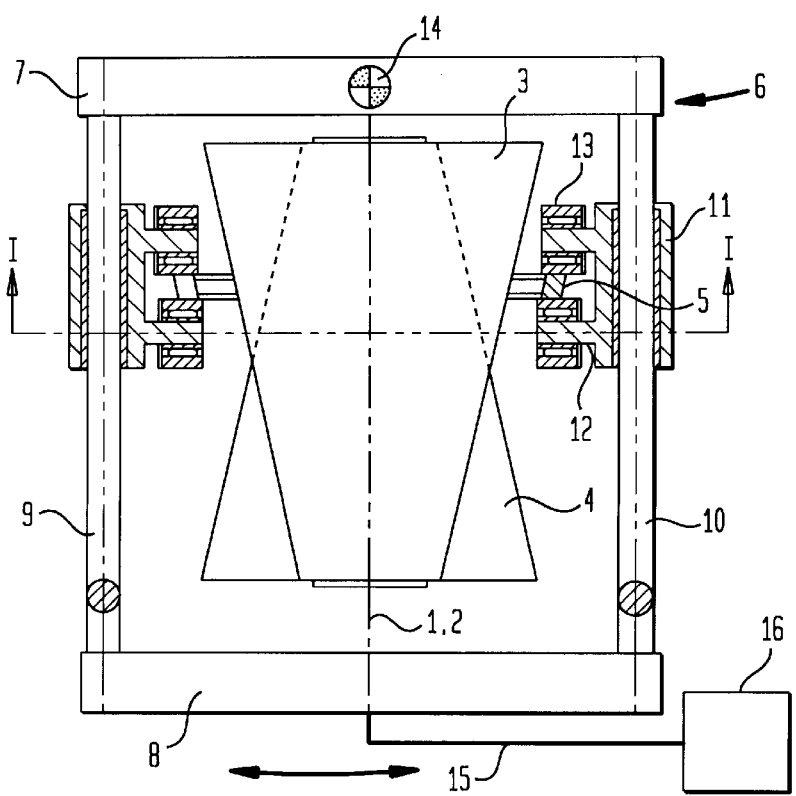
FIG. 2 is a top view of the friction cone gearing of FIG. 1.
Figure 3:
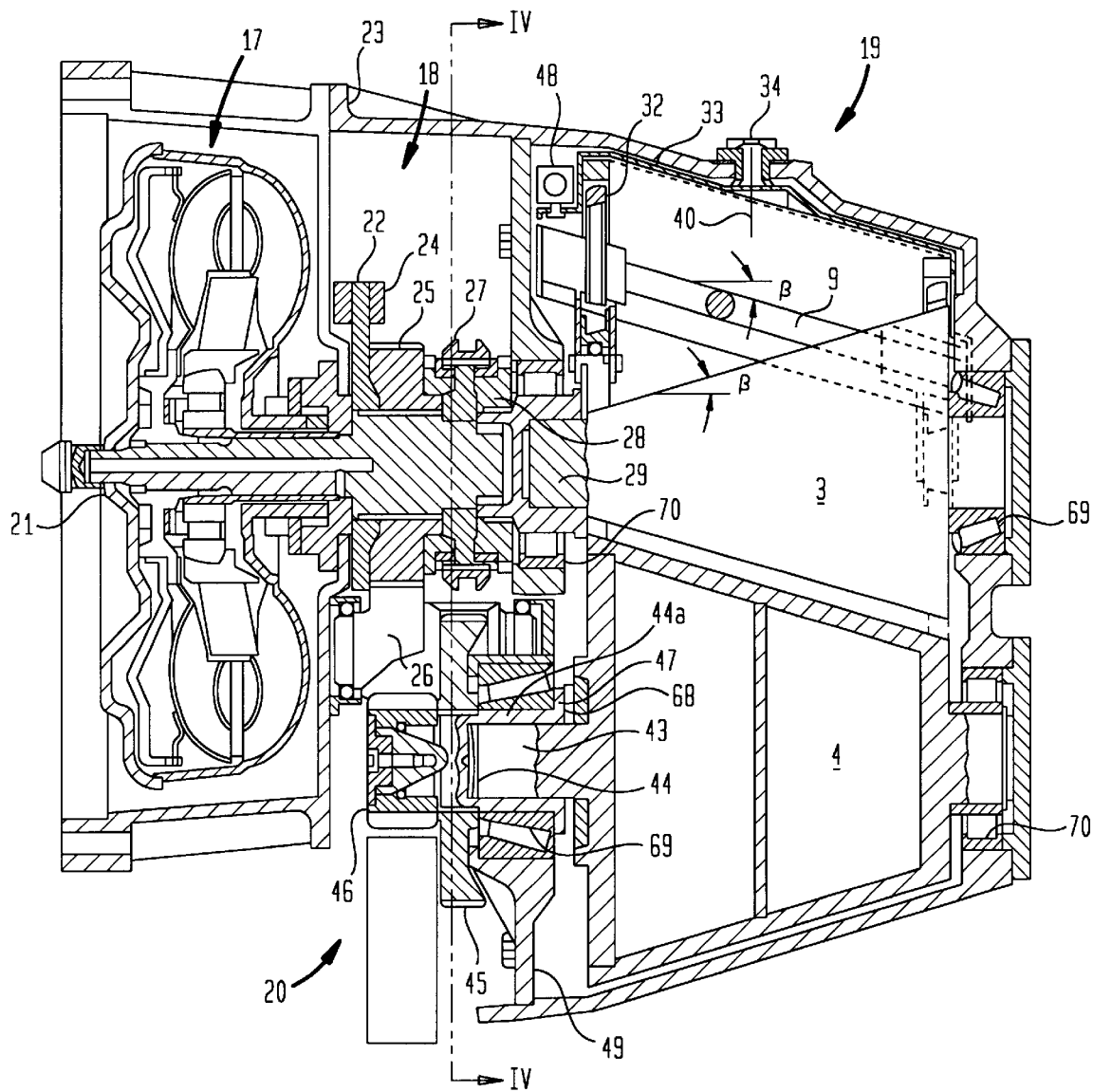
FIG. 3 is a longitudinal section through a front wheel drive of a motor vehicle, having incorporated therein a friction cone gearing according to the present invention.

Turning now to the drawing, and in particular to FIG. 1, there is shown a schematic, partially sectional view of a friction cone gearing according to the present invention, including two bevel wheels 3, 4 which are rotatable in opposite direction to one another about axes 1, 2 in spaced-apart parallel disposition at formation of a gap, and defined by a same taper angle β (FIG. 3). Positioned in the gap between the bevel wheels 3, 4 is a friction ring 5 which encircles the bevel wheel 3 and is in contact with both bevel wheels 3, 4. The friction ring 5 is retained in a cage assembly 6 which, as best seen in FIG. 2, is a frame in form of two crossbars 7, 8 in parallel disposition and two spaced apart rods 9, 10 interconnecting the crossbars 7, 8. The rods 9, 10 extend parallel to the axes 1, 2 as well as parallel to the generatrices of the bevel wheels 3, 4, inclined at the angle β and for support of an adjustment bridge 11. On each side, the adjustment bridge 11 includes two inwardly directed pins 12, with each pin 12 having mounted thereon a guide roller 13. Both guide roller 13 are so sized as to engage both sides of the friction ring 5 to provide a required axial guidance.

As shown in FIG. 2, the cage assembly 6 is swingably mounted to a vertical column 14 which is secured to the crossbar 7 and defines a pivot axis about which the cage assembly 6 can rotate, with the pivot axis extending in the plane defined by the pivot axes of the bevel wheels 3, 4. However, it is certainly within the scope of the present invention to orient the pivot axis 14 also in a plane parallel thereto or to intersect the plane defined by the pivot axes of the bevel wheels 3, 4 at an acute angle. A motor 16 is connected to a transversally mounted drive train 15 for operation of the cage assembly 6. A pivoting of the cage assembly 6 by a few angular degrees through activation of the motor 16, causes a pivoting of the friction ring 5 and an axial shift of the adjustment bridge 11 to thereby modify the transmission ratio of the bevel wheels 3, 4, whereby only very slight energy is required to effect this change.

Turning now to FIG. 3, there is shown a longitudinal section through a front wheel drive of a motor vehicle, having incorporated therein a friction cone gearing according to the present invention. The front wheel drive essentially includes a hydraulic converter or hydraulic clutch, generally designated by reference numeral 17, a selector mechanism, generally designated by reference numeral 18 and connected downstream of the hydraulic coupling 17, and a friction cone gearing according to the present invention, generally designated by reference numeral 19 and operatively connected to an output assembly, generally designated by reference numeral 20. The hydraulic coupling 17, which is of conventional design so that a detailed description thereof is omitted for sake of simplicity, has an output shaft 21 which supports a brake assembly in form of an electronically controlled brake disk 22 which cooperates with brake shoes 24 retained in a housing 23. The selector mechanism 18 includes a freely running gear 25 which is positioned immediately adjoining the brake disk 22 and meshes with a partially illustrated intermediate gear wheel 26 to enable the vehicle to move backwards The gear 25 is formed on one side with a crown toothing for activation through engagement with a selector sleeve 27 which is mounted on the output shaft 21 for axial displacement and is formed with an inner axial toothing.

A reversal of the traveling direction is effected by actuating the brake assembly 22, 24 to halt the drive shaft 29 so as to prevent a torque shock from interfering with operation of the friction cone gearing 19. Then, the selector sleeve 27 is moved, e.g. via a manually operated gear lever, from its neutral position shown in FIG. 3 to the right for engagement with a pinion 28 which is securely mounted on the drive shaft 29 of bevel wheel 3 of the friction cone gearing 19. Thus, a rotation of the drive shaft 29 is then transmitted from the upper bevel wheel 3 to the output shaft 43 of the lower bevel wheel 4. The change of traveling direction is thus effected via the selector sleeve 27, with the brake assembly 22, 24 stopping the gears 25, 26 to facilitate displacement of the selector sleeve 27.

The friction cone gearing 19, shown in FIG. 3, is formed in a same manner as described with respect to FIGS. 1 and 2, and includes the housing 23 accommodating two bevel wheels 3, 4 in radial spaced-apart disposition and rotating in opposite directions about parallel axes defined by a drive shaft 29 on which the upper bevel wheel 3 is secured and output shaft 43 on which the lower bevel wheel 4 is secured, whereby the drive shaft 29 and the output shaft 43 are supported by suitable journal bearings, such as taper roller bearings 69 and cylindrical roller bearings 70. The bevel wheels 3, 4 are defined by a same taper angle β, with the upper bevel wheel 3 being encircled by a friction ring 32 having an inner peripheral surface in frictional engagement with the bevel wheel 3 and outer peripheral surface in frictional engagement with the bevel wheel 4. The bevel wheels 3, 4 are suitably sealed against the housing 23, with lubrication of the bevel wheels 3, 4 and the friction ring 32 being effected through a separate lubricant circulation The bevel wheels 3, 4 may exhibit different diameters, as shown in FIG. 3, to thereby optionally save a transmission stage of the subsequent output 20. For weight reasons, the bevel wheels 3, 4 may be hollow.

Figure 4:
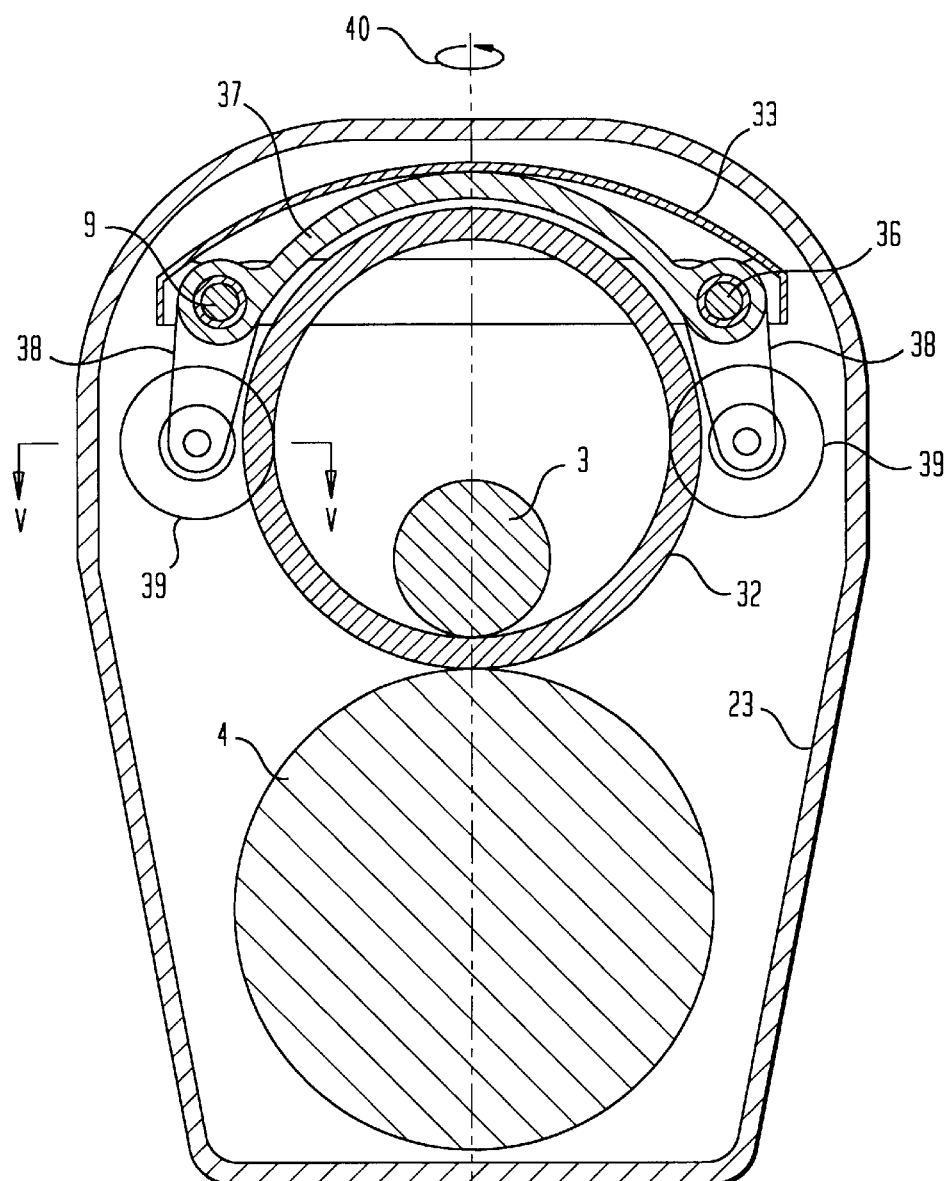
FIG. 4 is a sectional view of the friction cone gearing of FIG. 3, taken along the line IV—IV in FIG. 3.

As shown in FIG. 4, the friction ring 32 is retained in a cage assembly 33 which is swingably mounted to the housing 23 at location 34 for rotation about a pivot axis 40 which extends in a plane determined by the pivot axes of the bevel wheels 3, 4. In order to prevent great swinging ranges, the pivot axis 40 is disposed approximately in a mid-section of the axial dimension of the housing 23. It is noted however, that the pivot axis 40 may also be oriented, as described above, in a plane parallel thereto or intersect the plane defined by the pivot axes of the bevel wheels 3, 4 at an acute angle.

Figure 5:
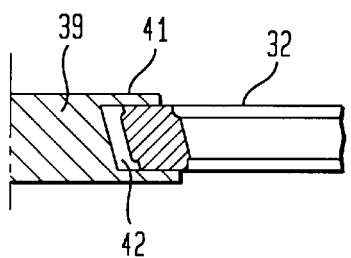
FIG. 5 is a cutaway sectional view, taken along the line V—V in FIG. 3.

The cage assembly 33 is formed by a frame comprised of two rods 9, 10 extending parallel to one another at an inclination corresponding to the taper angle β of the bevel wheels 3, 4. The rods 9, 10 support an adjustment bridge 37 having mounts 38 (FIG. 4) for attachment of guide rollers 39. As shown in FIG. 5, the guide rollers 39 are formed with a peripheral track 41 which is flanked by opposite flanges 42 to exhibit a forked configuration for engagement by the friction ring 32.

The friction ring 32 is pivotable about a rotational axis which is parallel to the pivot axes of the bevel wheels 3, 4. It is however also conceivable to so secure the friction ring 32 in the cage assembly 33 that the rotational axis of the friction ring 32 is oriented parallel to the generatrix of the facing bevel wheels 3, 4 and thus perpendicular to the outer surface area of the bevel wheels 3, 4.

The adjustment of the cage assembly 33 is effected through operation of an adjustment spindle 48 which is supported in the housing 23. The spindle 48 is operatively connected to a motor or magnet (not shown) and is in engagement with the cage assembly 33, as schematically indicated in FIG. 3. A slight turning of the cage assembly 33 by means of the spindle 48 turns the friction ring 32 about the pivot axis 40, thereby modifying the relative position thereof to the bevel wheels 3, 4. Thus, the position of the friction ring 32 is automatically changed to alter the transmission ratio of the friction cone gearing 19.

As further shown in FIG. 3, the output shaft 43 of the bevel wheel 4 is received in a pressure-application unit 44 which is supported in the housing 23 and carries output pinions 45, 46. The pressure application unit 44 includes an extension shaft 44a placed over the adjacent end of the output shaft 43 and formed with a flange 47 facing the bevel wheel 4 and having a radial toothing 68 for coaction with a complementary radial toothing of the bevel wheel 4. Through the provision of the radial toothing 68, an axial pressure is exerted onto the bevel wheel 4 upon application of a torque, whereby the axial pressure increases with increasing torque.

Advantageously, the housing 23 is subdivided by a partition 49 into two compartments, with one compartment accommodating the hydraulic coupling 17, selector mechanism 18 and output shaft 20, and with the other compartment housing the friction cone gearing 19. Thus, it is possible, to conduct a coolant without lubricating qualities, e.g. silicone oil, into the compartment housing the friction cone gearing 19 so that the friction value is not adversely affected. Other examples for use as coolant in the friction cone gearing include traction fluids or oil containing ceramic powder or other solid particles.

Suitably, the friction surfaces of at least one component of the friction cone gearing, e.g. the bevel wheels 3, 4 or the friction ring 32, are coated by a layer of hard metal or ceramics, e.g. of titanium nitride, titanium carbon nitride and titanium aluminum nitride or the like.

Figure 6:
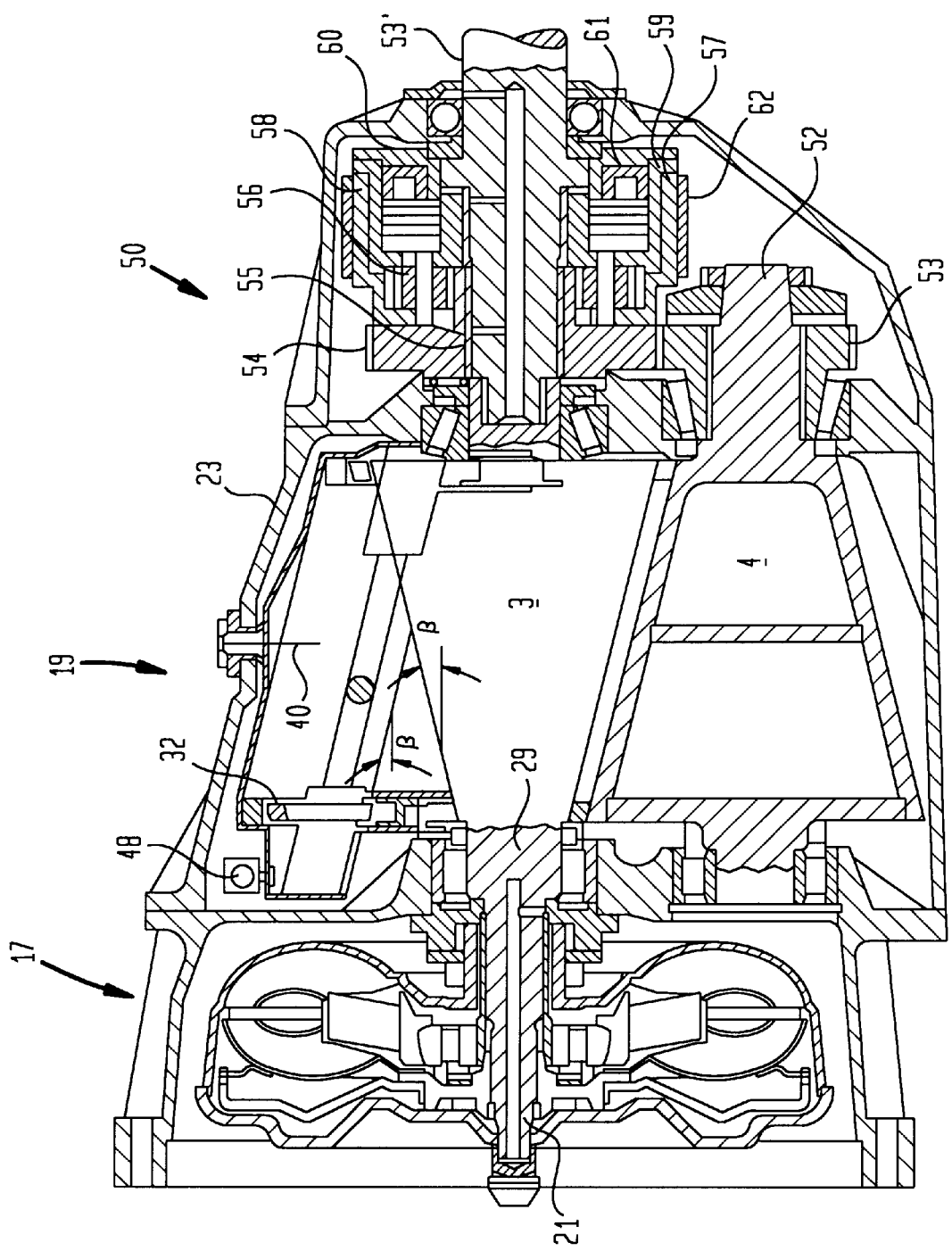
FIG. 6 is a longitudinal section through a rear wheel drive of a motor vehicle, having incorporated therein a friction cone gearing according to the present invention.

Turning now to FIG. 6, there is shown a longitudinal section through a rear wheel drive of a motor vehicle, having incorporated therein a friction cone gearing according to the present invention. Parts corresponding with those in FIG. 3 are denoted by identical reference numerals and not explained again. Disposed upstream of the friction cone gearing 19 is the hydraulic converter or hydraulic coupling 17, while a planetary gear train, generally designated by reference numeral 50 is positioned downstream the friction cone gearing 19. The output shaft 21 of the hydraulic coupling 17 is formed in one piece with the drive shaft 29 of the upper bevel wheel 30 which drives the lower bevel wheel 4 via the interposed friction ring 32. The bevel wheel 4 has an output shaft 52 which carries a pinion 53 in mesh with a freely rotatable gear 54 that is mounted on an output shaft 53' of the transmission. The output shaft 53' is in alignment with the drive shaft 29 and freely rotatable received therein.

A pinion 55 is formed in one piece with the gear 54 to form the sun wheel of the planetary gear train 50. The pinion 55 meshes with planet gears 56 retained in a planet carrier 57 which is capable of running about the output shaft 53'. The planet carrier 57 is formed with a cylindrical protusion 58 for supporting a hollow annulus 59 which is in mesh with the planet gears 56 and securely fixed to the output shaft 53' via an axial toothing 60.

The planetary gear train 50 further includes a multi-disk clutch 61 which is able to connect the output shaft 53' with the annulus 59. Further, a brake assembly 62 is attached to the cylindrical protusion 58 of the planet carrier 54. Operation of the multi-disk clutch 61 commences the front drive. When actuating the brake assembly 62, the planet carrier 57 is held in place, allowing a change of the rotation direction of the output shaft 53' of the transmission, and thus reversal of the traveling direction.

While the invention has been illustrated and described as embodied in a friction cone gearing, it is not intended to be limited to the details shown since various modifications and structural changes may be made without departing in any way from the spirit of the present invention.

What is claimed as new and desired to be protected by Letters Patent is set forth in the appended claims:

What is claimed is:

1. A frictional cone gearing, comprising;
   a first bevel wheel rotatable about a first rotational axis and defined by a taper angle;
   a second bevel wheel rotatable about a second rotational axis in parallel disposition to the first rotational axis and defined by a taper angle which is identical to the taper angle of the first bevel wheel;
   a friction ring operatively engaged with the first and second bevel wheels and circumscribing one of the bevel wheels, said friction ring being guided along a generatrix of both bevel wheels;
   a cage for retaining the friction ring, said cage being guided along the generatrix of both bevel wheels and being swingably mounted for rotation about a pivot axis; and
   a drive means for rotating the cage about the pivot axis, wherein said pivot axis of the cage extends in a plane selected from the group consisting of a plane defined by the rotational axes of the first and second bevel wheels, a plane in parallel disposition to the plane defined by the rotational axis of the first and second bevel wheels, and a plane intersecting at an acute angle the plane defined by the rotational axes of the first and second bevel wheels at an acute angle.

2. The gearing of claim 1 wherein the bevel wheels has ceramic surfaces.

3. In combination:
   a gearing according to claim 1;
   a transmission for a front wheel drive of a type having a hydraulic clutch, a selector mechanism for changing a traveling direction of the gearing and an output part secured to the gearing; and
   an electrically activated, fixed brake assembly mounted between the hydraulic clutch and the selector mechanism for allowing effective operation of the output part of the transmission.

4. In combination:
   a gearing according to claim 1;
   a transmission for a rear wheel drive of a type having a hydraulic clutch, an output shaft, and a planetary gear train interposed between the hydraulic clutch and the output shaft and including a sun wheel, a planet carrier, planet gears retained by the planet carrier, and an annulus coacting with the planet gears and operatively connected to the output shaft of the transmission;
   a brake assembly so configured as to act on the planet carrier for influencing a traveling direction; and
   a clutch assembly positioned between the annulus and the output shaft.

5. The gearing of claim 1 wherein the first and second bevel wheels have different diameters.

6. The gearing of claim 1 wherein at least one element selected from the group consisting of first bevel wheel, second bevel wheel and friction ring has a coating of a material selected from the group consisting of hard metal and ceramics.

7. The gearing of claim 6 wherein the at least one element is made of titanium nitride, titanium carbon nitride and titanium aluminum nitride.

8. The gearing of claim 1, and further comprising a housing for accommodating the bevel wheels, and a partition for subdividing the housing into different compartments, with the gearing being accommodated in a compartment that is separated from a transmission unit and bearing unit for the bevel wheels, thereby separating the friction zone between the friction ring and the bevel wheels from the bearing support of the bevel wheels.

9. The gearing of claim 1 wherein the first and second bevel wheels are of hollow configuration.

10. The gearing of claim 1, and further comprising a cooling system having a coolant having contained therein solid particles for generating a high friction value between the first and second bevel wheels.

11. The gearing of claim 10 wherein the coolant is air.

* * * * *

UNITED STATES PATENT AND TRADEMARK OFFICE
CERTIFICATE OF CORRECTION

PATENT NO. : 5,924,953
DATED      : July 20, 1999
INVENTOR(S): Ulrich Rohs

It is certified that error appears in the above-identified patent and that said Letters Patent is hereby corrected as shown below:

Column 5, Claim 1, line 49 delete
    "at an acute angle"

Signed and Sealed this

Nineteenth Day of September, 2000

Attest:

Q. TODD DICKINSON

*Attesting Officer*      *Director of Patents and Trademarks*